Jan. 28, 1958 H. J. WESTPHAL 2,821,037

COMBINATION DEVICE FOR PHOTOGRAPHIC SLIDES

Filed March 10, 1954 3 Sheets-Sheet 1

INVENTOR.
HENRY J. WESTPHAL
BY
[signature]
ATTORNEY

COMBINATION DEVICE FOR PHOTOGRAPHIC SLIDES

Filed March 10, 1954 3 Sheets-Sheet 2

INVENTOR.
HENRY J. WESTPHAL
BY
R. Durham Owen
ATTORNEY

Jan. 28, 1958 H. J. WESTPHAL 2,821,037

COMBINATION DEVICE FOR PHOTOGRAPHIC SLIDES

Filed March 10, 1954 3 Sheets-Sheet 3

INVENTOR.
HENRY J. WESTPHAL
BY
A. Donham Owen
ATTORNEY 2,821,037
Patented Jan. 28, 1958

2,821,037

COMBINATION DEVICE FOR PHOTOGRAPHIC SLIDES

Henry J. Westphal, Angwin, Calif.

Application March 10, 1954, Serial No. 415,359

5 Claims. (Cl. 40—64)

This invention relates to a combination device to facilitate the storage of a large number of photographic slides, particularly of the color transparency variety, and to permit a rapid previewing of these slides for the purpose of selecting and withdrawing particular slides for exhibition.

It is customary to mount photographic film so that it may be used with projection apparatus to form an enlarged image of the object on a screen or other viewing means. The most familiar example is the color transparency which is usually mounted in slide form to facilitate projection. Slide projection of black and white film is also common. Such slides may be glass slides, or, more generally, a simple cardboard frame around the film.

Heretofore, storage and handling of large numbers of these slides have presented a problem of considerable difficulty, despite the large number and variety of devices which have been offered commercially for the purpose. A principal defect of nearly all such devices is the necessity of removing each individual slide from the storage device before its suitability for projection can be determined. This is primarily due to the grouping of such slides in stacks, either horizontal or vertical, so that each slide must be removed from the stack before it can be viewed. Thus to choose a number of slides on a particular subject or activity, such as boating or skiing, the exhibitor must independently remove large numbers of slides for inspection before he can make his selection of the particular slides to be projected. Such previewing and selection procedures are not only tedious and time consuming, but also are a continuing source of annoyance to owners of even a relatively small number of slides.

A further problem in previewing and selecting slides for such an exhibition arises because the usual exhibitor wants to select carefully the slides to be shown. This is particularly true where there are a number of similar slides on the same subject matter or when the photographic quality of either the slide or its subject matter is important to the viewer. As a result, it is generally necessary to inspect each slide by holding it up to a light or putting it into a separate previewing apparatus. Such procedures only add to the time consumed in viewing and selecting individual slides for a showing, thereby creating a further source of annoyance.

The present invention is directed to a solution to the above and to many additional problems, as will appear, and one object of the present invention is to provide a combination storage, previewing and selection device, including an open-sided storage file and open-ended previewing box, each having aligned track or groove means, so that substantially flat slide carrying frames may be quickly moved on the track or groove means from a storage position in the file to a visible position in the previewing box, thereby permitting an entire group of slides in a single carrier frame to be quickly inspected at a single glance.

Another object of the present invention is to provide a combination previewing and storage device by which a large number of book-shaped slide storage files may be successively moved through the open end of a compartmented previewing device into a receiving compartment, so that slide carrier frames in any of the several storage files may be readily moved into a viewing position in an adjacent viewing compartment over track or groove means in both the receiving and viewing compartments.

Another object of the invention is to provide a box-like storage container for substantially flat slide carrying frames having track or groove means and an open side so that the frames may be moved on the tracks or grooves from a storage position within the container to a viewing position externally adjacent the container's open side.

Another object is to provide a storage file for slide carrying frames which is constructed in the shape of a book for ready storage and to facilitate indexing of subject matter.

Still another object of the present invention is to provide a slidable frame construction for supporting a large number of film transparencies in substantially the same plane, so that a group of slides contained within the frame structure may be quickly and easily inspected at a single glance.

Another object of the invention is to construct a pocketed slide carrying frame of several layers of material, each having aligned four-sided openings, with the middle layer having openings approximating the dimensions of the slides but larger than the openings in the other two layers, and preferably having resilient means on the top or bottom side of each of its openings so as to permit compression of the resilient means to slightly enlarge the opening during insertion of a slide, so that slides may be easily inserted into or removed from the carrier frame pockets but will be firmly retained in the frame pockets when in place. If these carrying frames are made of molded plastic, the several layers or part of them may be made in one piece.

Other objects and advantages of the present invention will appear from the following description and from the drawings in which.

Figures 1, 2, 3, 4, 5, 6, 7:
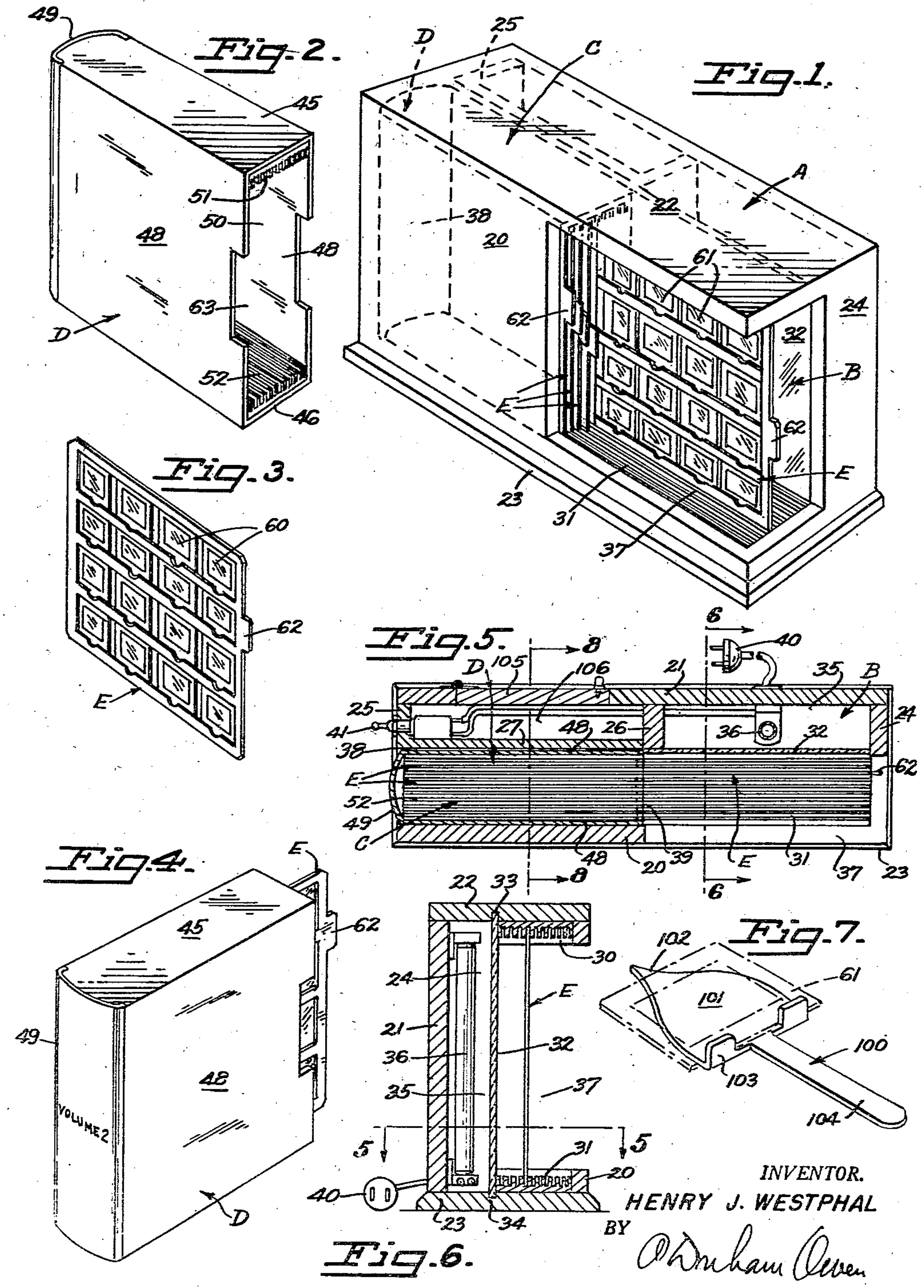
Fig. 1 is a view in perspective of a combination slide, storage, previewing and selection device according to the present invention showing one of the slide carrying frames pulled into the viewing position in the previewer.
Fig. 2 is a view in perspective of a box-like storage container for slide carrier frames as it would appear separated from the combination device of Fig. 1, and with its slide carrying frames removed to show the tracks or grooves in which the frames slide.
Fig. 3 is a view in perspective of an empty slide carrier frame removed from its position in the combination device of Fig. 1.
Fig. 4 is a view in perspective with the device of Fig. 2 rotated 90 degrees counterclockwise, showing, in addition, a slide carrying frame partly removed from its normal carrying position within the storage container.
Fig. 5 is a view in horizontal section of the device of Fig. 1 along the line 5—5 of Fig. 6.
Fig. 6 is a view in transverse section along the line 6—6 of Fig. 5.
Fig. 7 is a view in perspective of a tool that may be used to remove photographic slides from their positions in the slide carrier frames.

In a broad view the present invention includes a previewer box or cabinet A which is divided into a viewing compartment B and a receiving compartment C. Adapted for insertion into the receiving compartment C is a box-like storage file D which has track means aligned with corresponding track means in the viewer compartment B. As shown in Fig. 1, a plurality of slide carrying frames E is stored within the file D so that when the file is in position within the receiving compartment C of the previewer A, the carrier frames E may be pulled individually into a viewing position in the viewing compartment B on the aligned track means. In this way an entire group of film transparencies may be mounted in a single carrier frame E for previewing or inspection, at a glance, prior to selection and removal of particular slides for exhibition. The carrier frames E are of a unique three-layer construction for this purpose, having pockets 60 shaped to permit ready insertion and removal of individual mounted slides while insuring that the slides will be firmly and safely retained within the frame.

Referring now to the drawings in detail, the cabinet A is constructed as a six-walled box including a front wall 20, rear 21, top 22, bottom 23, and end walls 24 and 25. Intermediate the end walls is a central partition 26. The partition 26 and end wall 24, along with portions of the top, bottom, front and rear walls of the cabinet A, form the viewing compartment B. Similarly, the receiving compartment is formed by the partition 26, end wall 25 and the remaining portion of the top, bottom, front and rear walls. In this general manner the two substantially separate compartments B and C are provided.

As shown, the viewing compartment B is provided with track or groove means 30, 31, extending lengthwise along portions of its top and bottom walls 22, 23. Immediately adjacent the track means and separating the viewing compartment into two longitudinal sections is a translucent optical screen 32, constructed of any suitable material such as frosted glass or plastic. Preferably this screen is mounted in guide slots 33 and 34 in the top and bottom walls, as shown, to permit its easy replacement. A light source 36, such as a fluorescent lamp, is positioned in the enclosed chamber 35 formed behind the screen 32. To complete the viewing compartment, portions of the front wall 20 and end wall 24 are cut away in front of the screen to form a view and access opening 37, something like a stage.

Adjacent the viewing compartment B is the receiving compartment C. The end wall 25 and partition 26, forming the ends of this compartment, extend only part way across the interior of the cabinet A so as to provide vertically extending openings 38 and 39, respectively, at either end of the receiving compartment C. Preferably a guide wall 27 extends lengthwise between the walls 25 and 26 from points adjacent the openings 38 and 39, to form an open-end walled chamber 28 through the receiving chamber C. Completing the structure of the cabinet A is a suitable wall plug 40 and switch 41 which permit operation of the light source 36 in a well-known manner.

Adapted for insertion into the chamber 28 of the receiving compartment C through the opening 38 are the box-like storage files D. Preferably each file is constructed of five sides in the shape of a book, having a top 45, bottom 46, side walls 48 and a rounded title portion 49 forming the third side. The fourth side of the book-like structure is open as shown at 50 in Fig. 2. Provided in the top and bottom walls are track or groove means 51, 52, respectively, identical in spacing to those provided in the viewing compartment of the cabinet A. It is a particular feature of the present invention that when a storage file D is inserted through the opening 38 into its position in the chamber 28 of the receiving compartment C, its track means 51, 52 will be aligned with the corresponding track means 30, 31 of the viewing compartment B. Preferably it is a characteristic of each file D that it will fit snugly into the openings 38, 39 when properly installed in the receiving compartment C. In this way perfect alignment of the respective track means is insured.

Figures 8, 9:
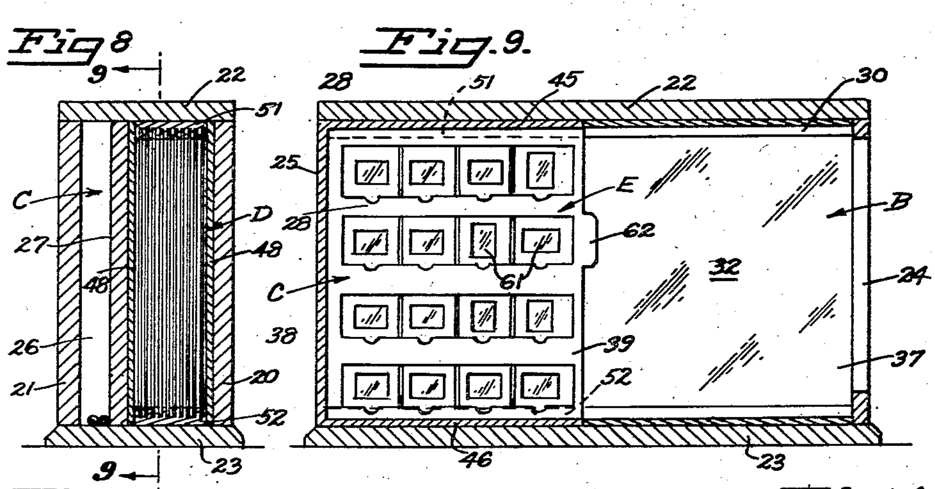
Fig. 8 is a view in transverse section along the line 8—8 of Fig. 5.
Fig. 9 is a view in longitudinal section along the line 9—9 of Fig. 8, showing all the carrier frames in storage position.

As best seen in Figs. 1, 5 and 9, a plurality of carrier frames E is provided within the storage file D so that individual frames may be independently moved on the aligned track means from a storage position within the file D to a viewing position in the compartment B. Each of the frames E is substantially flat and has a plurality of specially constructed pockets 60 to receive mounted transparencies or slides 61 of the type normally encountered in miniature camera photography. As shown, each frame E is dimensioned to fit exactly within the storage file D so that only a tab portion 62 extends beyond the side edges of the file. To facilitate pulling the carrier frames E out of the file by the tabs 62, the sides 48 of the file may be recessed as at 63, and the tabs staggered for ready access. See Figs. 1 and 2.

It will be clear from the above description that a combination storage, previewing and selection device is provided which permits the storage of a number of carrier frames E within separate storage files D and also the insertion of any particular file D in the receiving compartment C of the cabinet A, so that any of the separate slide carrier frames E may be pulled into a viewing position within the viewing compartment B. Such a viewing position of a carrier frame E is illustrated in Figs. 1, 5 and 6. In this position light from the source 36 will be directed against the back of the film slides 61 through the light-diffusing screen 32. As a result, it is possible to inspect quickly a number of slides mounted in the carrier E at a single glance.

When it is desired to inspect the slides on the next carrier frame E in sequence, it is but a simple matter to push the carrier frame back into the storage file D and to pull another carrier frame into viewing position by its tab 62. When the inspection or previewing of each of the slides in the carrier frame E has been completed, the storage file D may be removed from the receiving compartment C and put in a suitable storage place such as a bookcase or filing cabinet. In this way a number of such storage files may be quickly inserted in succession in the receiving compartment C, so that the carrier frames in each may be rapidly inspected.

The ultimate result is that a large number of mounted slides 61 may be quickly previewed for any desired purpose. Thus, if the owner of a large number of slides on different subjects desired to show some of his slides on a particular subject, using conventional slide projection apparatus, the storage previewing and selecting device of the present invention would make it possible for him to preview his entire slide collection in a relatively short time. During this preview he could remove quickly the individual slides desired for exhibition. After the slides had been shown, he could just as quickly return the slides to their respective positions in the files D, as will appear.

As has been indicated, the present invention permits a unique procedure for storage a large number of individually mounted photographic slides or transparencies, providing ready, visual access to each slide in a moment's time in the previewer or out of it. This is possible because a large number of such slides can be mounted on the substantially flat surface provided by each carrier frame E.

An important phase of the present invention is the carrier frame E. Such a frame must permit rapid insertion or removal of each mounted slide 61 into or from any desired pocket 60 in the carrier frame. In addition, each slide should be firmly and safely held in the pocket after insertion so that it will be adequately protected from damage during either storage or previewing.

A preferred construction for a carrier frame suitable for the above purpose is illustrated in Figs. 10–15. As shown, the carrier frame E is constructed of three layers 70, 71, 72 rigidly secured together to form the slide receiving pockets 60. The central frame member or backing 71 forms the body of the carrier frame E and is provided with a series of elongated openings 74. Each of these openings 74 has upper, lower and vertical sides 75, 76, 77, 78, respectively, with their vertical dimensions slightly larger than the vertical dimensions of a standard photographic slide 61. The horizontal distance between the sides 77 and 78 is in multiples of the size of the mounted slides plus the slight clearance needed between slides. Spaced at intervals along the upper side 75 of each opening are pluralities of resilient means 79 which, preferably, are blocks of sponge rubber or any other suitable resilient material. The lower side 76 of each opening has a series of recesses 80, with one under each space that is to receive a slide. Each recess 80 may be spaced directly opposite its resilient means 79 to facilitate the insertion or removal of the slide into or from that space, as will be later explained. Instead of being made from a sheet of material of the thickness desired for the space between the front face 70 and the rear face 72, the center layer **71*a* may be made as shown in Fig. 17 where the sheet is thin and is embossed to give the thickness between the layers 70 and 72**. For this purpose a thin sheet of aluminum or of board which dries hard and stiff when molded may be used.

The front face 70 forms a retaining member and, like the center layer 71, has a series of elongated openings 81. These openings, formed by upper, lower and vertical sides 82, 83, 84 and 85, respectively, correspond in shape and are positioned adjacent the openings 74. The vertical dimension of each opening 81 is smaller than its related opening 74, so that it overhangs the top and the bottom edges of the opening 74. The vertical dimension between 82 and 83 is less than that of a mounted slide 61, but large enough so that when the slide 61 is lifted toward the upper edge 75, the bottom edge of the slide will clear the edge 83 and drop down behind it. The lower edge 83 has recesses 86 in vertical alignment with the recesses 80 in the center layer 71. (See Figs. 13 and 14.)

The back face 72 forms a retaining member and is provided with a series of individual square openings 87 formed by vertical ribs 88. Each individual opening has upper, lower and vertical sides 89, 90, 91 and 92, respectively, with the dimension smaller than the overall size of the mounted slide 61 and at least as large as the area filled by the transparency. The vertical ribs 88 act as guides for the positioning of slides within the pockets 60.

Preferably each carrier frame E is formed by bonding the separate frame members 70, 71 and 72 together like a sandwich to form an integral unit. In the embodiment shown, a molded plastic frame member is used for the center layer 71, with plastic front and back layers 70, 72, bonded to it. The carrier frame E may also be constructed of many other suitable materials, such as light sheets of aluminum (Fig. 17) or solid fiber craft board for the center layer, with outer frames of heavy paper, pressboard, or plastic secured thereto, as by an adhesive or glue.

Figures 11, 12, 13, 15, 16:
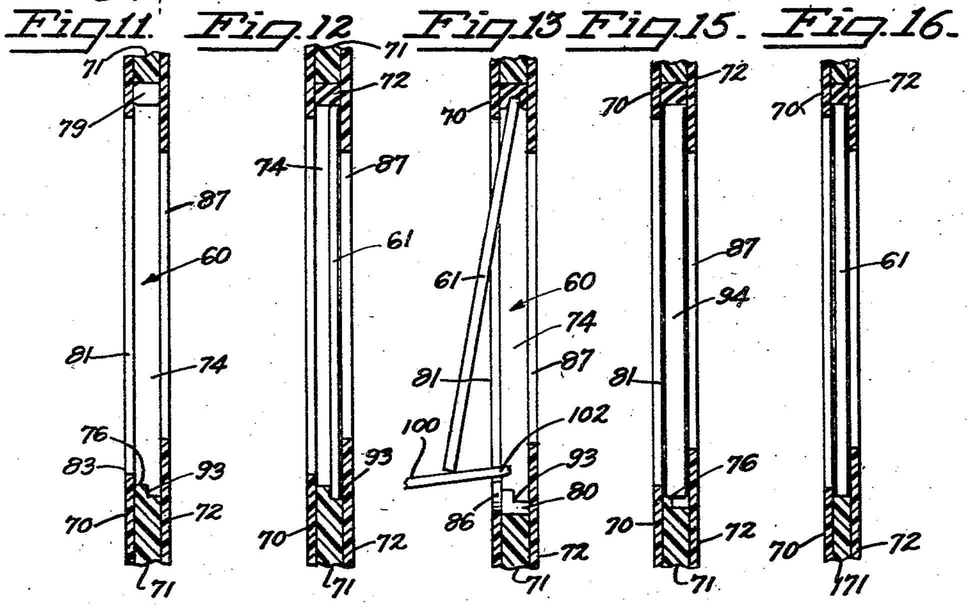
Fig. 11 is a view in vertical section of the top row along the line 11—11 of Fig. 10.
Fig. 12 is a like view of the second row along the line 12—12 of Fig. 10, showing a conventional paper-mounted color slide in position in the carrier frame, and with the slide shown in elevation.
Fig. 13 is a view in vertical section taken from a position generally indicated by line 13—13 of Fig. 10, but showing the manner in which the slide shown in Fig. 12 may be lifted and removed from its position within the carrier frame.
Fig. 15 is a view similar to Fig. 12, with a glass-mounted slide in position in the carrier frame.
Fig. 16 is a view similar to Fig. 12, showing the carrier frame when made to accommodate paper-mounted slides only.

With particular reference to Figs. 11–15 it will be seen that the horizontally elongated pockets 60 are formed by the overlapping edges of the front and rear frame members 70, 72, with respect to the opening in the center frame member 71. This is the case also in the carrier frame of Fig. 16 where the center layer 71 is only thick enough to accommodate a paper-mounted slide 61. In Figs. 11, 12, 13 and 15 the center layer 71 is thicker and the bottom edge 76, 93, is adapted to hold paper or glass-mounted slides. In Fig. 11 the pocket 60, provided between the front and rear frames 70, 72, is clearly illustrated. Preferably, the vertical distance between the resilient pad 79 and the bottom edges 76, 93, of the pocket 60 is about equal to the standard dimension of a conventional photographic slide, so that each slide will not be under compression, but will be locked while in the pocket.

Since the device of Figs. 11, 12, 13 and 15 is adapted to receive slides of different thicknesses, I prefer to provide a step in the lower edge of each center layer 71, so that there is a surface 76 on which a thick glass-mounted slide will rest (Fig. 15) and a surface 93 on which a thinner paper-mounted slide will rest (Fig. 12). As a result of this stepped structure, both types of slides may be snugly yet safely positioned within the pockets 60, since in neither case is there any vertical compression of the slide in the pockets by the pads 79. As a result, slides positioned within the pockets 60 will receive a maximum degree of protection during long periods of storage or use. For those who have only paper-mounted slides it is preferable to have the center layer 71 thinner, so that the overall thickness of the carrier frame E is kept at a minimum and the slide rests on the lower edge 171. (See Fig. 16.)

To lock each slide in its pocket, a resilient pad 79 is provided, as is best illustrated in Figs. 12, 15 and 16. To insert or remove a slide, it is lifted until the bottom edge of the slide will pass freely over the lower edge 83 of the opening 81. This causes the upper edge of the slide to bury itself in the pad 79. (Fig. 13.) To remove a slide, it is only necessary to insert a finger nail or other sharp, pointed means into the opening provided by the aligned recesses 80, 86, lift the slide upwardly, and pull the lower edge of the slide outwardly over the lower edge 83 of the pocket 60.

Figure 14:
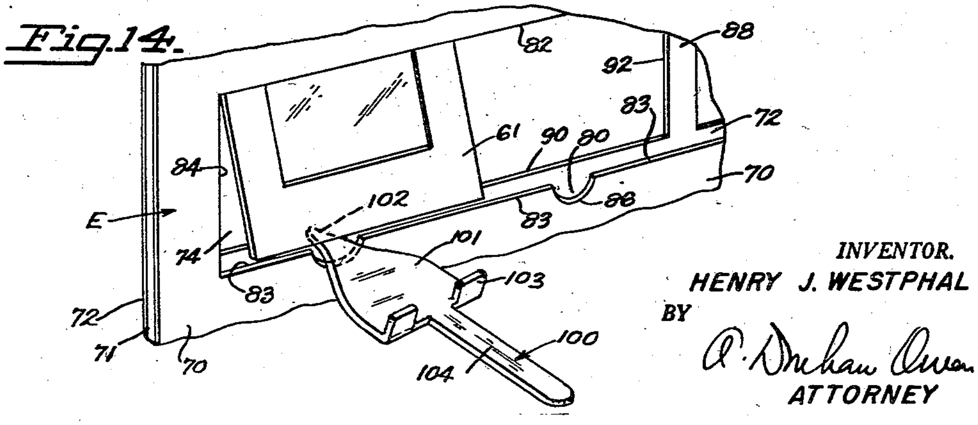
Fig. 14 is a view in perspective of the operation shown in Fig. 13.
Figures 10, 17:
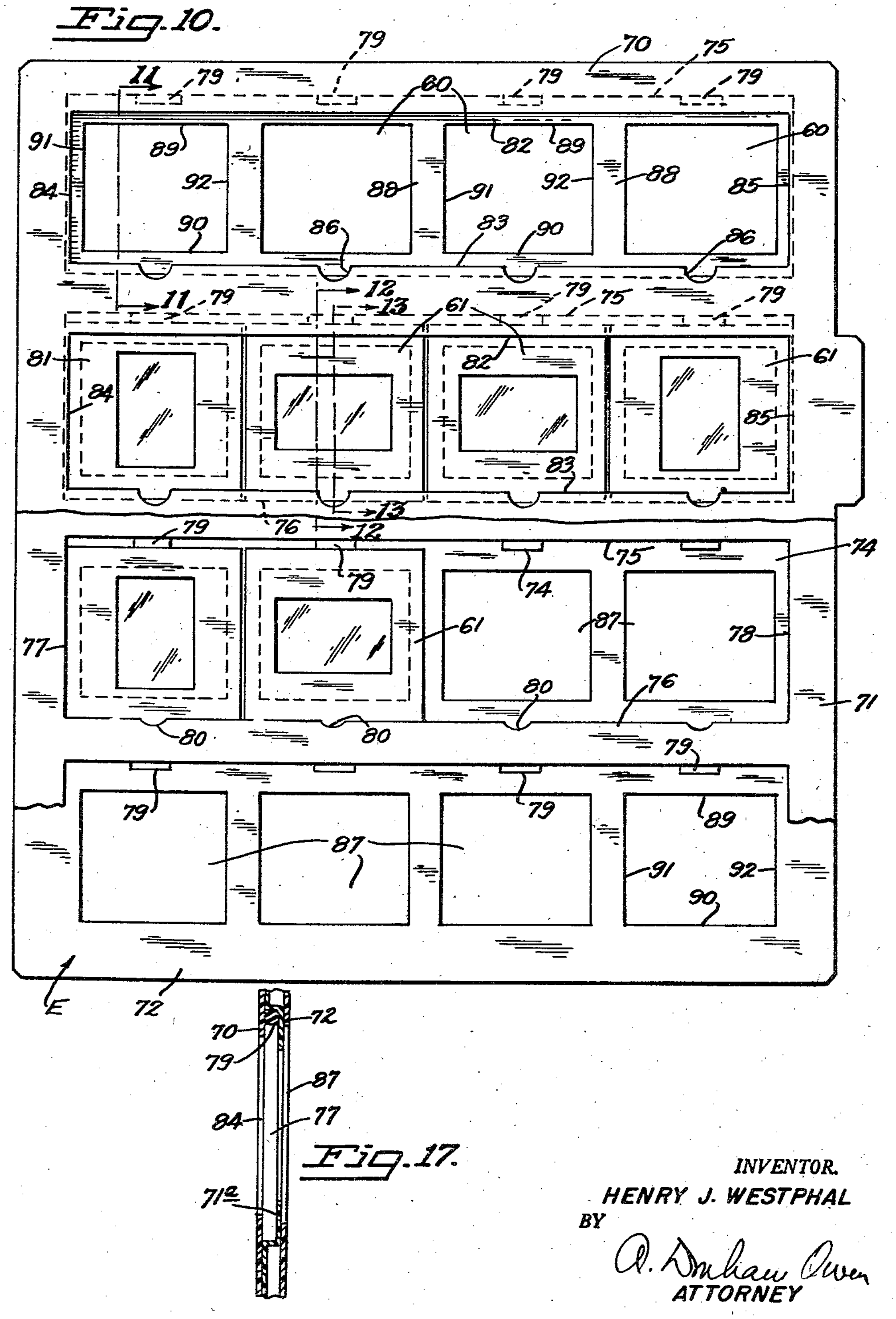
Fig. 10 is a view in plan and partly broken away, showing a slide carrier frame with the top row ready to receive slides, with the second row having slides in its pockets, with the third row having the front layer cut away, and with the bottom row having the front and middle layers removed to reveal the construction of the back layer.
Fig. 17 is a view like Fig. 16, showing a modification of the center layer when made of a thin sheet of material, embossed to make it rigid and to give the desired thickness between the front and back layers.

To facilitate insertion or removal of the slides, a handy scoop 100 may be provided. As shown in Figs. 7 and 14, the scoop has a flat blade portion 101 with a pointed end 102 and raised slide supports 103 extending vertically upward from the base of the blade. The operation of the scoop 100 will be clear from Fig. 14, where the pointed end 102 has been inserted beneath the lower edge of the slide and the scoop pivoted about the handle 104 to raise the lower edge of the slide 61 up and over the edge 83 of the opening 74. Continued movement of the scoop about the handle 104 will cause the slide to settle against the supports 103 as shown in Fig. 7, and the thumb may be pressed against the slide between the supports 103. The slide may then be transported to any desired position by the blade portion 101 of the scoop 100. To insert a slide with the scoop 100, the process shown in Fig. 14 is reversed with the handle 104 being pivoted upward about the pointed end 102 to permit the slide 61 to drop into the pocket 60. If desired, a suitably constructed door 105 may be provided in the wall 21, so that the chamber 106 may be used for storing both the scoop 100 and the wall plug 40.

It will be apparent that a plurality of slides 61 may be supported in the pockets 60 of each carrier frame, with all the slides in a single frame E being mounted in substantially the same plane. The slides, once positioned in their pockets 60 with a resilient pad 79 above each one, are not likely to jostle out of the pockets no matter how rough the handling to which the carrier frame is subjected. In some cases it may also be desirable to provide a continuous resilient strip instead of the separate pads 79 for this purpose, and material other than rubber may be used.

With the carrier frames E, just described, it is possible to store large numbers of individually mounted photographic slides or transparencies in a way that permits rapid inspection of the slides without removing them from their storage pockets. Further, the slides are firmly and safely mounted when in the pockets 60 so that the possibility of damage to the slides through excessive handling is greatly diminished. When combined with the tracked storage files D, the carrier frames provide many additional advantages useful when storing large numbers of photographic slides. For example, a number of slides may be grouped in a particular carrier frame according to the subject matter depicted, the quality of the slides, chronological sequence, or in any other convenient manner. The storage files permit a number of such carrier frames to be conveniently stored together for general reference. Likewise, provision may be made for a general indexing of the frames E on the outside of the storage file D, on the frames themselves, or on both. In particular, the files D may be stored as books, with the subject matter indicated either generally or specifically on their title portions 49.

Once such a filing system has been established, it is a simple matter to insert a desired storage file D into the receiving compartment C of the previewer A, so that the subject matter of any carrier frame E within the file may be quickly and easily inspected at a glance by pulling the frame E into the viewing compartment B. In addition, the close grouping of a large number of slides in a viewing position on a single carrier frame permits the viewer to compare the individual slides in a manner not previously possible. This is particularly useful when inspecting similar slides or slides in pictorial sequence.

To those skilled in the art to which this invention relates, many additional changes in construction and widely differing embodiments and applications of the invention will suggest themselves without departing from the spirit and scope of the invention. It should be clear that the disclosures and the description herein must be looked upon as purely illustrative and as not intended to be in any sense limiting.

I claim:

1. A combination slide film storage, previewing, and selection device adapted to facilitate visual access to a large number of mounted slide films comprising an open-sided box frame having a plurality of parallel track means provided in wall portions thereof, a light source in said box frame and translucent means separating the track means from the light source; a book-shaped file having an open side adapted for insertion and removal through one open end of said box frame, said file having a plurality of parallel track means aligned with the track means in said box frame; and a plurality of slide film carrier frames, each adapted to slide on said tracks from a position within said book-shaped file to a viewing position adjacent the light source in said box frame; whereby a large number of slides in each of said carrier frames may each be previewed prior to a selection therefrom for the purpose of exhibition.

2. The device of claim 1 in which said box frame is constructed of six walls and has a six-sided opening cut in two of the walls at one end of the box frame, so that a slide carrier frame will be clearly visible from a point outside the box frame when in a viewing position in the track means of said box frame.

3. A combination slide film storage, previewing, and selection device adapted to facilitate visual access to a large number of mounted slide films comprising an open-sided box frame constructed of six walls with a four-sided opening provided in one end wall, having track means provided in wall portions thereof, a light source in said box frame and translucent means separating the track means from the light source; a book-shaped file having an open side adapted for insertion in the four sided opening of said box frame, said file having track means aligned with the track means in said box frame; and a plurality of slide film carrier frames, each adapted to slide on said tracks from a position within said book-shaped file to a viewing position adjacent the light source in said box frame; whereby a large number of slides in each of said carrier frames may each be previewed prior to a selection therefrom for the purpose of exhibition.

4. A combination device for storage, previewing and selection for exhibition of a large number of mounted color transparencies comprising a box-like previewer including a viewing compartment having a light source adjacent one end wall, track means in top and bottom wall portions of said viewing compartment, a side wall of said viewing compartment having an opening oppositely adjacent said light source, and a receiving compartment having an access opening adjacent an opposite end wall of said previewer; a five-sided file adapted to slidingly fit into the receiving compartment of said box and having top and bottom track means aligned with the track means in said viewing compartment; and a plurality of carrier frames mounted for sliding movement on said track means from a storage position within said file to a viewing position within said viewing compartment, each of said carrier frames being provided with a plurality of pockets for said color transparencies; whereby said color transparencies may be quickly previewed prior to selection for projection.

5. A device for storing, previewing, and selecting for exhibition a large number of mounted color transparencies, including in combination a box-like previewer divided interiorly by a vertical widthwise wall into a viewing compartment and a receiving compartment, said compartments being joined together by an opening through said widthwise wall, said viewing compartments having an open forward wall, an open end wall, and a vertical lengthwise translucent wall with a light source behind said translucent wall and horizontal guide tracks on the interior top and bottom wall portions of the viewing compartments forward of said wall, said receiving compartment having an access opening through its end wall opposite the opening that joins said receiving and viewing compartments; a five sided portable file adapted to fit slidably and removably into said receiving compartment through said access opening and having horizontal guide tracks on its interior top and bottom wall portions, aligned with the guide tracks of the viewing compartments when said file is in said receiving compartment; and a plurality of slide-carrying frames mounted for sliding movement along said guide tracks from a storage position within said file to a viewing position within said viewing compartment, each said frame having a plurality of slide-retaining pockets for color transparencies.

References Cited in the file of this patent

UNITED STATES PATENTS

| | | |
|---|---|---|
| 53,354 | Spooner | Mar. 20, 1866 |
| 209,158 | Carlisle et al. | Oct. 22, 1878 |
| 226,717 | Clacher | Apr. 20, 1880 |
| 321,950 | Crafts | July 14, 1885 |

(Other references on following page)

UNITED STATES PATENTS

| | | |
|---|---|---|
| 989,031 | Oliver | Apr. 11, 1911 |
| 1,119,544 | Schmidt | Dec. 1, 1914 |
| 1,133,889 | Smith | Mar. 30, 1915 |
| 1,219,610 | White | Mar. 30, 1917 |
| 1,466,038 | Brubaker | Aug. 28, 1923 |
| 1,467,108 | Hodgson | Sept. 4, 1923 |
| 1,617,304 | Groeschel | Feb. 8, 1927 |
| 1,840,719 | Hutchinson | Jan. 12, 1932 |
| 2,291,173 | Simpson | July 28, 1942 |
| 2,311,646 | De Sherbinin | Feb. 23, 1943 |
| 2,383,465 | Bradford | Aug. 28, 1945 |
| 2,402,076 | Painter | June 11, 1946 |
| 2,509,722 | Carl | May 30, 1950 |
| 2,567,561 | Hoffman | Sept. 11, 1951 |
| 2,576,888 | Padgett | Nov. 27, 1951 |
| 2,645,869 | Cook | July 21, 1953 |
| 2,646,636 | Gandee | July 28, 1953 |
| 2,699,619 | Fink | Jan. 18, 1955 |
| 2,704,901 | Halse | Mar. 29, 1955 |